United States Patent
Persson

(10) Patent No.: US 10,792,565 B2
(45) Date of Patent: Oct. 6, 2020

(54) COMPUTER SERVER, A METHOD AND COMPUTER PROGRAM PRODUCT

(71) Applicant: KING.COM LIMITED, St. Julians (MT)

(72) Inventor: Fredrik Persson, Stockholm (SE)

(73) Assignee: KING.COM LTD., St. Julians (MT)

( * ) Notice: Subject to any disclaimer, the term of this patent is extended or adjusted under 35 U.S.C. 154(b) by 363 days.

(21) Appl. No.: 15/333,418

(22) Filed: Oct. 25, 2016

(65) Prior Publication Data
US 2018/0111048 A1    Apr. 26, 2018

(51) Int. Cl.
| | | |
|---|---|---|
| A63F 13/35 | (2014.01) | |
| A63F 13/25 | (2014.01) | |
| A63F 13/40 | (2014.01) | |
| A63F 13/335 | (2014.01) | |
| A63F 13/49 | (2014.01) | |
| A63F 13/355 | (2014.01) | |
| A63F 13/497 | (2014.01) | |

(52) U.S. Cl.
CPC .............. *A63F 13/35* (2014.09); *A63F 13/25* (2014.09); *A63F 13/335* (2014.09); *A63F 13/355* (2014.09); *A63F 13/40* (2014.09); *A63F 13/49* (2014.09); *A63F 13/497* (2014.09); *A63F 2300/538* (2013.01)

(58) Field of Classification Search
CPC ........ H04L 67/02; A63F 13/25; A63F 13/335; A63F 13/355; A63F 13/40; A63F 13/49
See application file for complete search history.

(56) References Cited

U.S. PATENT DOCUMENTS

| | | | |
|---|---|---|---|
| 8,408,982 B2 * | 4/2013 | Marty ................ | G06K 9/00342 463/2 |
| 9,349,201 B1 | 5/2016 | Gault et al. | |
| 2012/0108330 A1 | 5/2012 | Dietrich et al. | |
| 2012/0309515 A1 * | 12/2012 | Chung ................ | H04N 21/274 463/31 |
| 2013/0159375 A1 * | 6/2013 | Perry .................... | H04L 67/02 709/201 |
| 2014/0194211 A1 * | 7/2014 | Chimes ................ | A63F 13/497 463/43 |

OTHER PUBLICATIONS

International Search Report, dated Feb. 7, 2018, and Written Opinion, issued in corresponding PCT Application No. PCT/EP2017/076734.

* cited by examiner

*Primary Examiner* — William H McCulloch, Jr.
*Assistant Examiner* — Ankit B Doshi
(74) *Attorney, Agent, or Firm* — Saul Ewing Arnstein & Lehr LLP

(57) ABSTRACT

A game server receives game data associated with a computer implemented game played on a user device. Using this data the computer implemented game is recreated in dependence to generate video data which corresponds to the computer implemented game being played on the user device.

18 Claims, 15 Drawing Sheets

Figure 6a

| Player ID 600 | Game ID 602 | Device ID 604 | Game level 606 | Level seed 608 | Inventory information 612 |

Figure 6b

| Player ID 600 | Game ID 602 | Game event 612 |

Figure 13a

| Sequence | Action | Delay |
|---|---|---|
| 1 | Game Start Animation | 1200 ms |
| 2 | Player thinks | 160 ms |
| 3 | Player swipe candy | 250 ms |
| 4 | Game move animation | 360 ms |
| 5 | Player thinks | 3580 ms |
| 6 | Player swipe candy | 180 ms |
| 7 | Game move animation | 360 ms |
| ... | ... | ... |
| 56 | Player thinks | 980 ms |
| 57 | Player swipe candy | 220 ms |
| 58 | Game move animation | 360 ms |
| 59 | Player thinks | 700 ms |
| 60 | Player swipe candy | 260 ms |
| 61 | Game end animation | 2800 ms |

1412 points to row 2 (Player thinks, 160 ms); 1410 points to row 5 (Player thinks, 3580 ms).

Figure 13b

| Sequence | Action | Delay |
|---|---|---|
| 1 | Game Start Animation | 1200 ms |
| 2 | Player thinks | 200 ms |
| 3 | Player swipe candy | 250 ms |
| 4 | Game move animation | 360 ms |
| 5 | Player thinks | 200 ms |
| 6 | Player swipe candy | 250 ms |
| 7 | Game move animation | 360 ms |
| ... | ... | ... |
| 56 | Player thinks | 200 ms |
| 57 | Player swipe candy | 250 ms |
| 58 | Game move animation | 360 ms |
| 59 | Player thinks | 200 ms |
| 60 | Player swipe candy | 250 ms |
| 61 | Game end animation | 2800 ms |

1411 points to row 2 (Player thinks, 200 ms); 1413 points to row 5 (Player thinks, 200 ms).

COMPUTER SERVER, A METHOD AND COMPUTER PROGRAM PRODUCT

FIELD OF THE INVENTION

Embodiments of this application relate a computer server, a method and computer program product for providing videos of computer implemented games.

BACKGROUND OF THE INVENTION

Game video streaming is becoming increasingly popular. In game video streaming, game play is streamed to an audience. In its simplest form, viewers receive a video stream of the player's screen. In some cases, there may be additions to this video stream. Examples of such additions are audio from the player, video of the player (as opposed to the game), text from viewers to the player, and chat between players and viewers.

The game play can be either streamed directly to the viewers, or recorded to be played back later. Some features of the streaming such as chat depend on the game play being streamed.

In casual mobile games, the whole game play occurs in a mobile phone or similar device. To offer game streaming, the screen of the mobile phone needs to be captured and transmitted over the network.

The inventors have recognised that there are a number of technical difficulties with this approach such as difficulties in recording the screen of the mobile phone, difficulties in obtaining the necessary permissions to record the game application from another application, bandwidth availability from the mobile phone to the network, monthly bandwidth quotas associated with a phone subscription, and screen resolution differences, such as recording on iPhone 4s for display on a HD TV.

SUMMARY OF THE INVENTION

According to an aspect, there is provided a game server comprising: an input configured to receive game data associated with a computer implemented game, said computer implemented game being played on a user device, said data comprising information about one or more moves made responsive to user input during playing of said computer implemented game on said user device; at least one processor configured to re-create said computer implemented game in dependence on said received game data to generate video data, said video data corresponding to said computer implemented game being played on said user device; and an output configured to output said video data.

The input may be configured to receive said game data substantially in real time and said at least one processor is configured to generate said video data substantially in real time.

The at least one processor may be configured to retrieve, from a data store, a set of said game data for said game and to generate said video data therefrom.

The at least one processor is configured to retrieve from a data store, said game data for one part of said game and to receive game data for another part of said game substantially in real time, said at least one processor being configured to generate said video data from said game data for said one part of the game and the game data for said another part of said game.

The game server may comprise said data store.

The at least one processor may be configured to receive via said input said set of game data from said data store.

The at least one processor may be configured to generate said video data in a plurality of different formats.

The video data may be associated with a format different to a format used by said user device to display said computer implemented game.

The video data may have one or more different parameters to a corresponding parameter used by the user device.

The one or more parameters may comprise one or more of: resolution; quality; frame rate; layout; orientation.

The input may be configured to receive further data to be combined with said output video data.

The further data may comprise one or more of audio data, video data and text data.

The data may comprise time stamp information, and said at least one processor may be configured to re-create said computer implemented game with a timing dependent on said time stamp information.

The at least one move may be associated with a first timing and said at least one processor may be configured to retain said first timing in said video data.

The at least one move may be associated with a first timing and said at least one processor may be configured to change said first timing to a second timing in said video data.

The input may be configured to receive a request for a video, said at least one processor may be configured to determine if said requested video is available and if so to cause said requested video to be provided to a requester of said video.

The input may be configured to receive a request for a video, said at least one processor may be configured to determine if said requested video is available and if not to cause said requested video to be generated and provided to a requester of said video.

According to another aspect, there is provided a computer implemented method performed by a computer game server, said server having at least one processor, an input and an output, said method comprising: receiving at said input game data associated with a computer implemented game, said computer implemented game being played on a user device, said data comprising information about one or more moves made responsive to user input during playing of said computer implemented game on said user device; re-creating by said at least one processor said computer implemented game in dependence on said received game data to generate video data, said video data corresponding to said computer implemented game being played on said user device; and outputting via said output said video data.

The method may comprise receiving said game data substantially in real time and generating said video data substantially in real time.

The method may comprise retrieving, from a data store, a set of said game data for said game and generating said video data therefrom.

The method may comprise retrieving from a data store, said game data for one part of said game and receiving game data for another part of said game substantially in real time and generating said video data from said game data for said one part of the game and the game data for said another part of said game.

The game server may comprise said data store.

The method may comprise receiving via said input said set of game data from said data store.

The method may comprise generating said video data in a plurality of different formats.

The video data may be associated with a format different to a format used by said user device to display said computer implemented game.

The video data may have one or more different parameters to a corresponding parameter used by the user device.

The one or more parameters may comprise one or more of: resolution; quality; frame rate; layout; orientation.

The method may comprise receiving further data to be combined with said output video data.

The further data may comprise one or more of audio data, video data and text data.

The data may comprise time stamp information, and the method may comprise re-creating said computer implemented game with a timing dependent on said time stamp information.

The at least one move may be associated with a first timing and the method may comprise retaining said first timing in said video data.

The at least one move may be associated with a first timing and the method may comprise changing said first timing to a second timing in said video data.

The method may comprise receiving a request for a video, determining if said requested video is available and if so to causing said requested video to be provided to a requester of said video.

The method may comprise receiving a request for a video, determining if said requested video is available and if not to causing said requested video to be generated and provided to a requester of said video.

According to another aspect, there is provided a non-transitory computer readable storage device storing instructions that, when executed by at least one processor of a computer server causes said at least one processor to perform the following steps: receive input game data associated with a computer implemented game, said computer implemented game being played on a user device, said data comprising information about one or more moves made responsive to user input during playing of said computer implemented game on said user device; re-create said computer implemented game in dependence on said received game data to generate video data, said video data corresponding to said computer implemented game being played on said user device; and output said video data.

According to some aspects, there is provided a program product comprising a computer-readable storage device including a computer-readable program for providing a computer-implemented game, wherein the computer-readable program when executed on a computer causes the computer to perform any one or more of the method steps described previously.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF DRAWINGS

To understand some embodiments, reference will now be made by way of example only to the accompanying drawings, in which:

FIGS. 6a and 6b shows a data structure used in some embodiments;

FIG. 13a shows timings associated with various game actions in real time and FIG. 13b shows the corresponding actions with associated timings in the generated video.

DETAILED DESCRIPTION OF SOME EMBODIMENTS

In the following description of various implementations, reference is made to the accompanying drawings which form a part thereof, and in which is shown by way of illustration various implementations may be utilized. The terms user and player are used interchangeably throughout this document and no specific meaning is intended using one or the other unless the context suggests otherwise.

Figure 1:
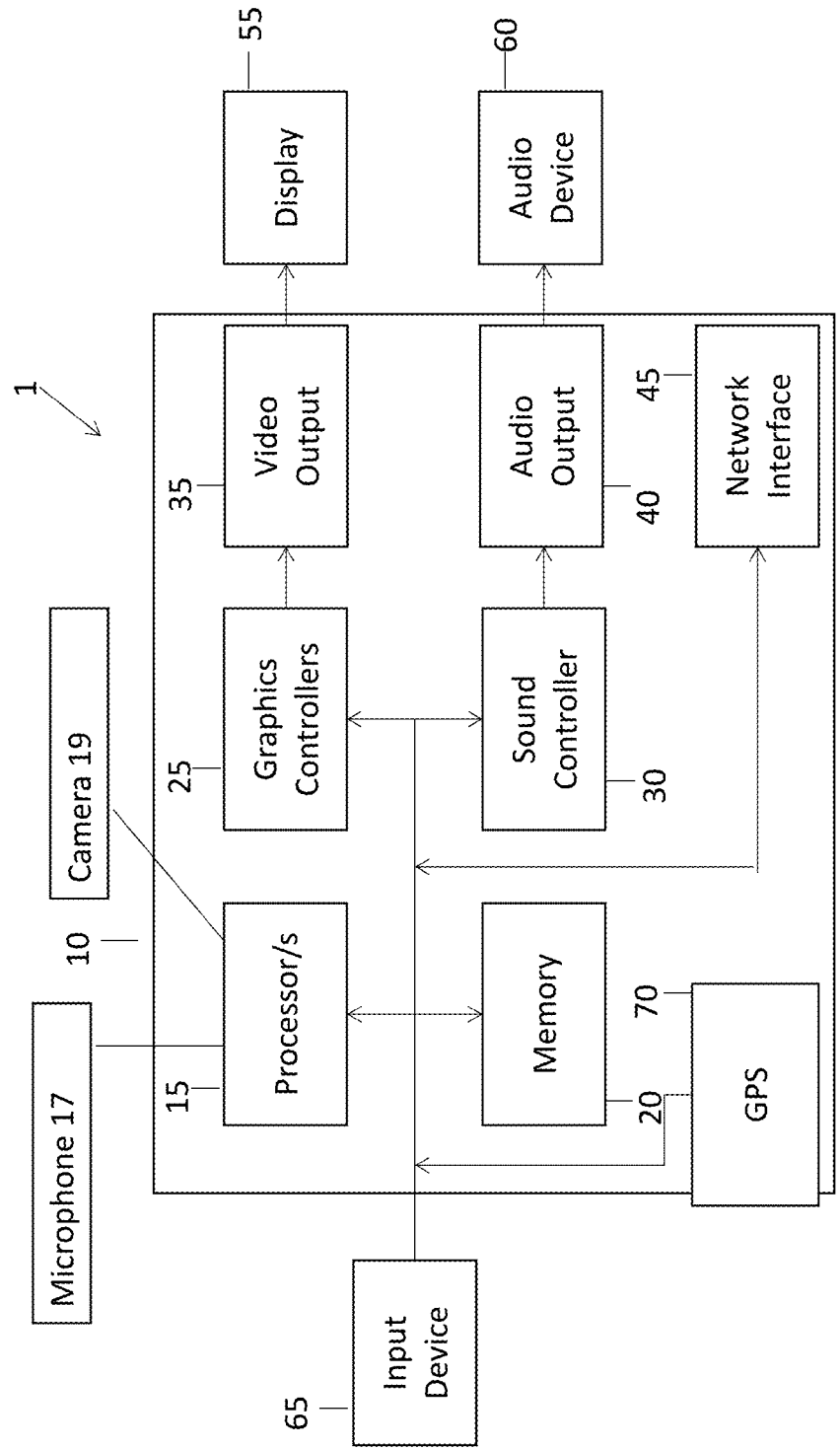
FIG. 1 shows an example user device in which some embodiments may be provided.

A schematic view of a user device 1 according to an embodiment is shown in FIG. 1. All of the blocks shown are implemented by suitable circuitry. The blocks may be implemented in hardware and/or software. The user device may have a control part 10. The control part may be implemented by one or more processors 15 and one or more memories 20.

The control part 10 is shown as having a graphics controller 25 and a sound controller 30. It should be appreciated that one or other or both of the graphics controller 25 and sound controller 30 may be provided by the one or more processors 15 or may be separately provided. The graphics and sound controllers may comprise memory and/or may operate in conjunction with the one or more memories 20.

The graphics controller 25 is configured to provide a video output 35. The sound controller 30 is configured to provide an audio output 40. The video output 35 is provided to a display 55. The audio out 40 is provided to an audio device 60 such as a speaker and or earphone(s).

An audio capture device such as a microphone 17 may be provided. An audio input may be captured by the microphone and may be processed by the processor and/or any other suitable processor. This is optional is some embodiments In other embodiments, the sound controller and audio device may additionally capture and process audio data.

An image capture device 19 may be provided. The image capture device is a camera in some embodiments. The image captured by the camera may be processed by the processor and/or any other suitable processor. This is optional is some embodiments The control part 10 has an interface 45 allowing the device to be able to communicate with a network such as the Internet or other communication infrastructure. The control part 10 may have a GPS module 70 or similar configured to provide location information to the at least one processor 15 or memory 20. This is optional is some embodiments.

The device 1 has an input device or user interface 65. The input device can take any suitable format and can be one or more of a keyboard, mouse, touch screen, joystick or game controller. It should be appreciated that the display 55 may in some embodiments also provide the input device 65 by way of an integrated touch screen for example.

The blocks of the control part 10 are configured to communicate with each other by an interconnect such as a bus or any other suitable interconnect and/or by point to point communication.

It should be appreciated that in some embodiments, the controller may be implemented by one or more integrated circuits, at least in part.

The user device 1 is shown by way of example only. In alternative embodiments, one or more of the parts may be omitted. Alternatively or additionally, some embodiments may comprise one or more other parts. Alternatively or additionally, one or more parts may be combined.

Figure 2:
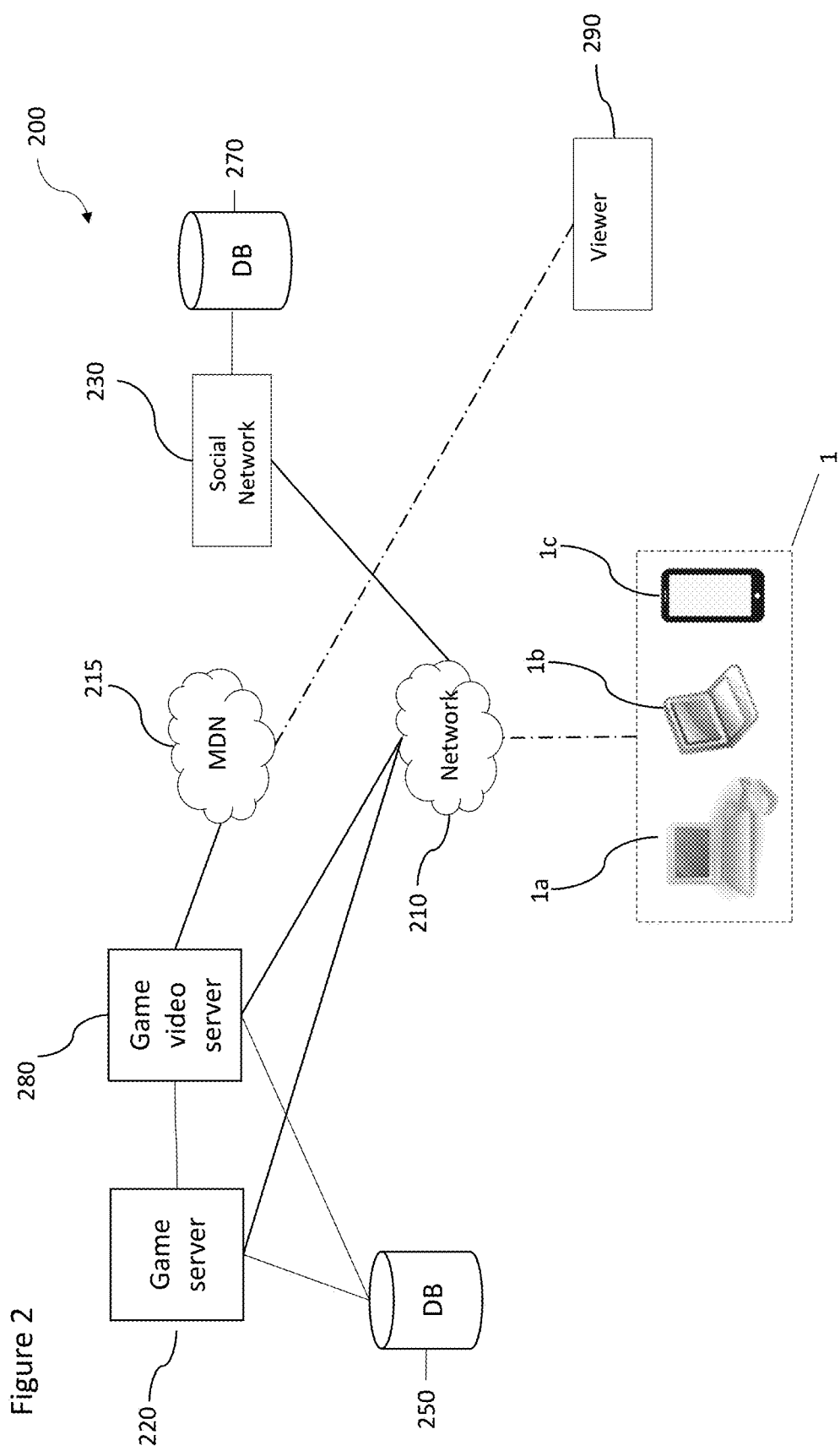
FIG. 2 shows an example system in which some embodiments may be provided.

FIG. 2 schematically shows a system 200 according to an embodiment. The system 200 comprises a game server 220 which may store or be in communication with a database 250 of game player's details, profiles, statistics etc. In practice, one or more databases 250 may be provided. In practice, one or more servers 220 may be provided. Where one or more server is provided, the database(s) 250 may be provided in one database 250 across two or more servers.

The game server 220 may communicate via, for instance, the internet 210 to one or more client or user devices 1, shown in FIG. 2 by way of example as user devices 1a, 1b and 1c, and may further provide connections to a social network 230, for example, Facebook™. The social network 230 may also be connected to a database 270 storing social user interaction details, for instance, user to user interaction maps, friend lists, location history etc. In practice, one or more databases 270 may be provided. The connection to the database 270 of the social network 230 may result in a local copy of the database 270 being made on the user device 1.

As will be described in more detail, a viewer device 290 may be provided for viewing media associated with game play. The viewer device may be any suitable device and by way of example only may comprise a client or user device such as previously described. The viewer device may be configured to receive media content from a game video server 280 via a media distribution network MDN 215. The MDN 215 may be the same or different from the network 210. In some embodiments, the game video server 280 may be the same server as the game server 220. In other embodiments, the game video server 280 may be a different server as the game server 220.

In some embodiments, one or more game video servers may be provided.

It should be recognised by those skilled in the art that the databases herein referred to may comprise external or remote storage, such as that described as being in a "cloud".

It should be appreciated that embodiments may be deployed in different system architectures. For example, the computer game may be implemented as a computer game that is stored in the memory of the user device and is run on the processor of the user device. However, the server may handle some elements of the game in some embodiments. By way of example only, a Java game applet may be provided to the user device and the locally running Java applet will generate, for example, the graphics, sounds, and user interaction for the game play on the user device. Some data may be fed back to the server to allow interaction with other user devices. The data which is fed back may also allow scoring and/or cross platform synchronization.

The game may be played in an offline mode on a handheld device using locally stored information on the handheld device. The device may store all or some of the levels that are available as applicable to the particular game and its saga or mission objectives. Some of the features may be locally executed on the device. This may for instance implement a scheme to regenerate lives after a certain period of time, the time may be locally decided based on the clock on the device. In some embodiments, the central game server clock may override the local clock when the local device has been synchronised with the server.

One example of a game with which embodiments may be used is a 'match-3 game' where the player is required to find patterns on a seemingly chaotic board. The player then has to match three or more of the same type of game element on the game board and those matched elements will then disappear. In some games the user has to match more than 3 game elements. It should be appreciated that these types of game are used to illustrate some embodiments. However, it should be appreciated that embodiments are not limited to such genres of computer implemented game but may be used with any suitable computer implemented game. Embodiments may be used with single player games or with games having two or more players.

One type of match game is the so called 'switcher' game where the player switches place on two adjacent game elements on the game board so that one or both of them create a chain of at least three adjacent game elements of the same type. Those matched game elements will then disappear. In a typical switcher game the game board will be repopulated with game objects.

Figure 3A:
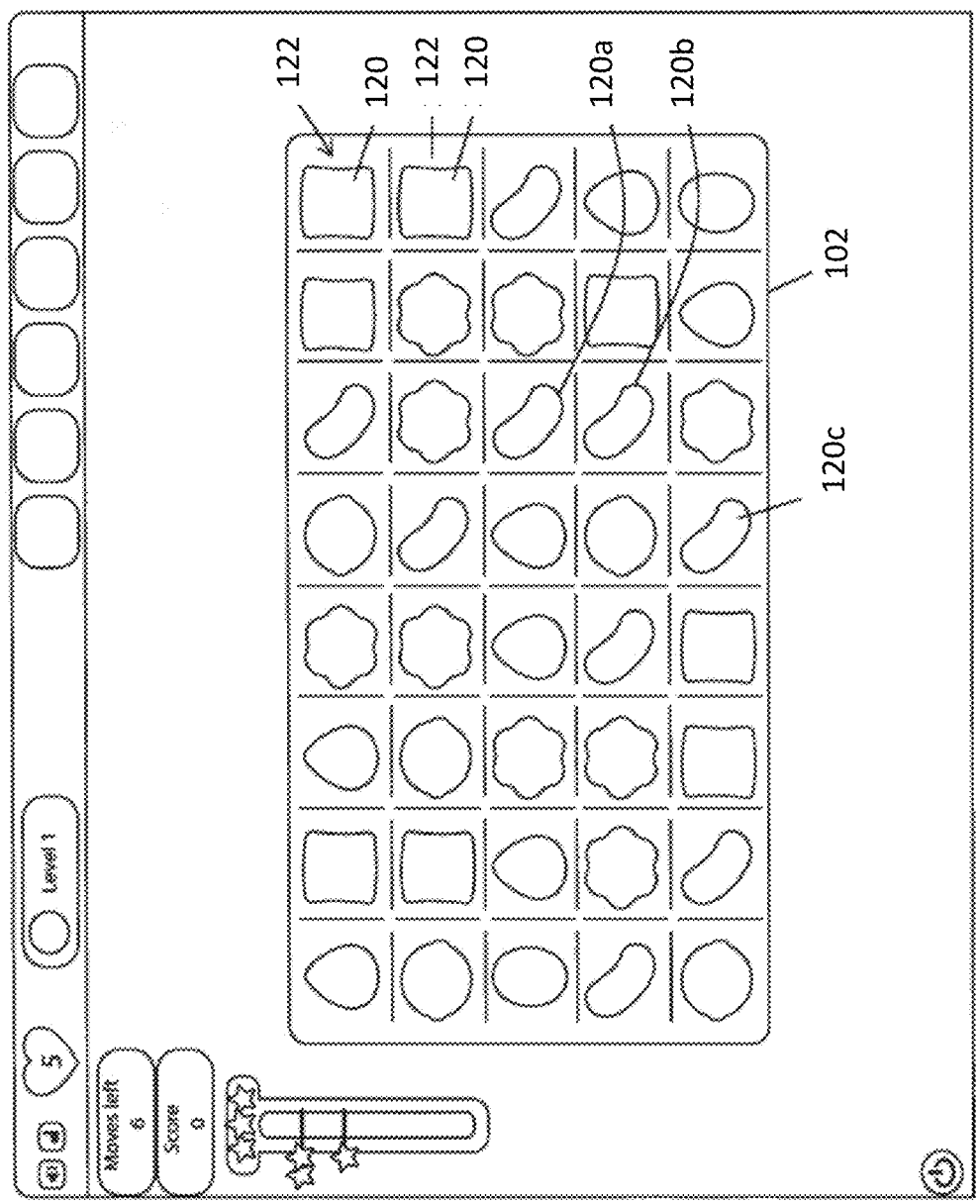
FIG. 3a shows an example embodiment of a game board.

FIG. 3a shows a display of a known version of a match 3 switcher game called Candy Crush Saga™. FIG. 3a illustrates a game board 102 with a plurality of game elements 120. The game elements are each of six different shapes and colours. Each game element is supported by a tile 122. The tiles are not readily visible to a player of the game—the game elements are the main focus for a player. However, the tiles govern characteristics of the game elements which are visible to a player as will be described in more detail later.

In the known version of the match 3 switcher game, the aim of the game is to swap game elements in the shape of candies with each other to make moves on the game board. To gain points the player has to make moves that create matches of at least three of the same candy. In doing so, the player gains points and the matched candies are removed. As a result new candies fall into place from the top of the game board in order to fill any spaces created. Assume in FIG. 3a that game element 120c is moved one place to the right to form a three-line match with game elements 120a and 120b. This has the effect of game board elements 120a, 120b and 120c "disappearing", creating a visual effect (animation) on the screen to indicate the disappearance. The two game elements which were directly above game elements 120*a* will now fall downwards into the spaces created by the removal of game elements 120*a*, 120*b* and 120*c*. The game elements on the newly created tiles which fall downwards into the game board are generated at random. The user then has a new game board on which to play a subsequent move.

Another example of a match game that embodiments can be used with are the so called 'clicker' games where the player can click on a group of adjacent game elements of a certain type and those will then be removed. Some clicker games only require two adjacent objects to remove those elements if clicked by the user. Others may require more than two.

Another type of match game is a so called 'shooter' game where the player launches for example a ball or bubble on to the game board trying to aim at groups of similar game elements already on the game board. If the launched ball hits or forms a group of more than 3 similar game elements then that group of game elements are removed from the game board.

It is clear that embodiments may be used with any other suitable types of games.

In some embodiments, the game may be provided with different levels. Each level may have a specific goal.

Some embodiments may be provided in the context of so-called saga games. These are games which have one or more levels. In some games, a user may be required to complete a certain level before the user is able to progress to a next level. In some embodiments, the user may be able to go back and play any previous level.

A game may have a number of different levels. Different levels may have different requirements to be met. For example, some levels may have one or more specific goals. These goals could be to reach a certain amount of points before running out of moves or time; to bring down certain game elements to the bottom of the screen; to remove a certain amount of game elements before running out of moves or to collect certain game elements through specific matches before running out of moves. These are by of example only, and any other additional or alternative goals may be provided.

If the game becomes difficult there are boosters to help the player pass a level. These can be obtained from in-game purchases or received as gifts from Facebook friends.

Figure 3B:
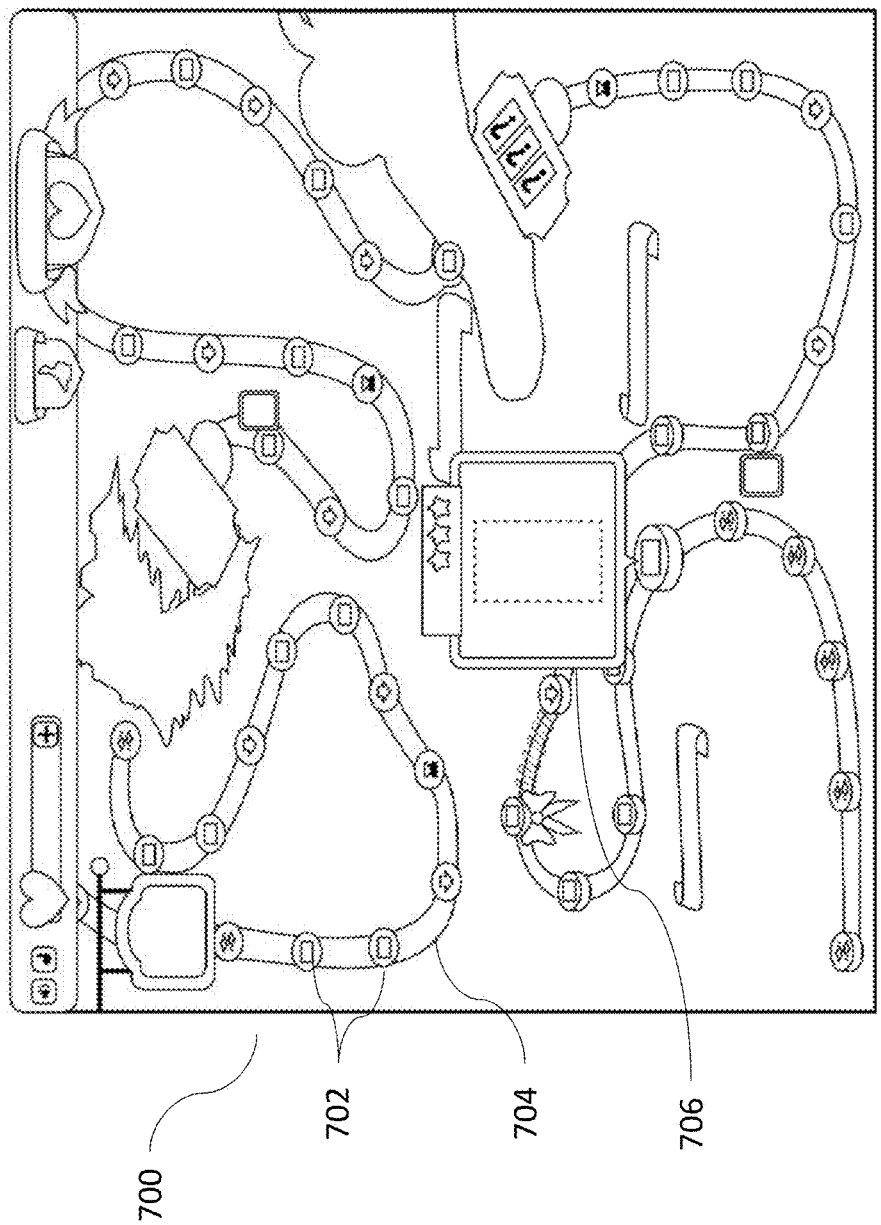
FIG. 3b schematically shows a representation of different levels of a game.

In some embodiments, the different levels may be represented on a map 700. FIG. 3*b* schematically shows one example of such a view. Different levels 702 are represented on a path 704 so that the user can see the progress which he has made playing the game. This also allows a user to go back and replay levels which he has previously played. The map view may show what levels have been completed as well as how many levels are left to play. Throughout the game and for each level completed, the player journeys across the map. In some embodiments, the levels are divided up into groups or chapters. These may be referred to as episodes. In some embodiments, there may be a theme associated with each chapter.

In some embodiments, if the player has connected to a social network, then friends' progress from the same network may be viewed on the map by the means of information provided next to the highest level they have currently reached or by virtue of a league table which can be displayed. In other embodiments, the progress of non-social network players may alternatively or additionally be shown. In some embodiments, the progress of one or more of the best player or players at each level may be shown.

In the map view, the player can hover over a level to display a thumbnail 706 of it. This makes it easier to find specific already completed levels, and can also give the player an idea of what to expect before actually starting a level. In some embodiments, thumbnails can be displayed for any level. In some embodiments, no thumbnails can be displayed for levels that have not yet been reached. In some embodiments, the thumbnail option is not provided.

Information may be provided on the map to display how well the player has done on the level if he has played it previously. This can for instance be represented with the number of stars the player has received on that level, the actual score or some other indication. This may be done via the thumbnail option, by displaying information on the map or by any other suitable mechanism.

In some embodiments, the game can be implemented so that a player progresses through multiple levels of changing and typically increasing difficulty. As the player travels through the levels in the game, his progress may be represented as a journey along a path in the virtual map.

In some embodiments, the player moves between levels and completes the levels one by one along a path by playing the associated game. When the player reaches the goal of a level, the next level is unlocked and the player can play that level in the game.

The number of stages and levels can vary depending on the implementation. The levels may be numbered consecutively throughout the game or they can be numbered within a stage, it is also understood that other ways of identifying the levels can be provided.

It should be appreciated that the map view is only one way in which progress may be shown and in different embodiments, progress may be represented in a different way.

It should be appreciated that some embodiments may be used in conjunction with a game which has only one level.

Figure 4:
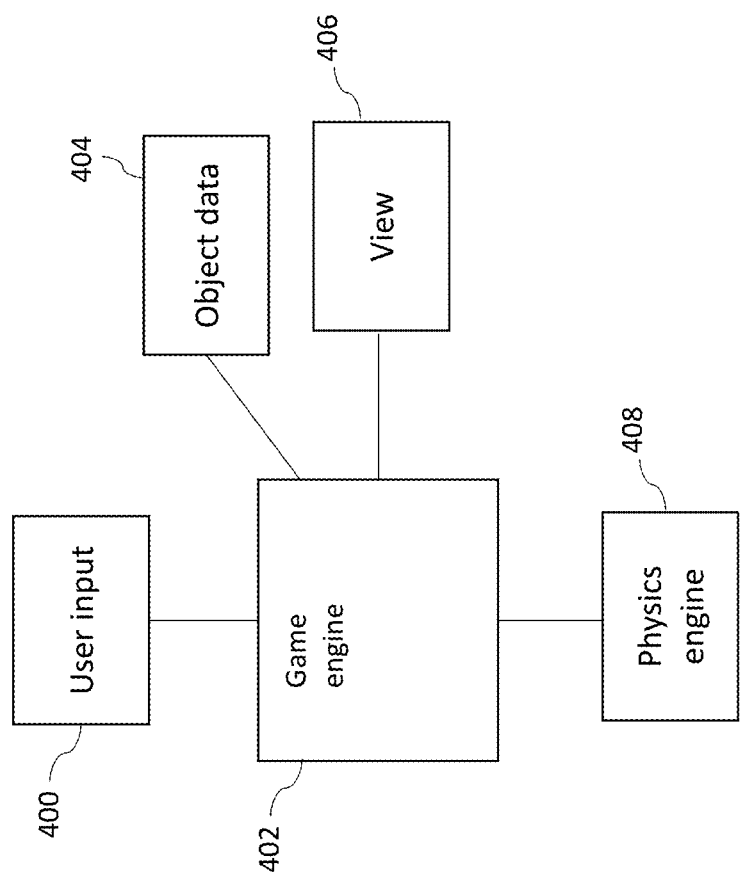
FIG. 4 is a schematic diagram showing the modules and functions associated with carrying out the operating of embodiments.

Reference is made to FIG. 4 which is schematically shows the functional blocks of an embodiment as provided in a user device. One or more of the functional blocks may be provided by any suitable one or more blocks shown in FIG. 1. A user input block 400 is shown. This captures the user input and feeds the input to a game engine 402. In the context of this game, this will be determining a position of a pointer or a user's finger in the case of a touch screen. This user input can be via any suitable user interface, such as discussed earlier.

The game engine 402 will process the information provided by the user input. The game engine 402 (for example a game model) may for example determine if a valid selection of a first object has been made or if a move is valid.

Each object has object data associated therewith. The object data 404 may be stored in any suitable memory location. In some embodiments, the object data may be considered to be part of the game engine and in other embodiments may be considered to be outside the game engine. The object data may provide information as to the properties of an object. These properties can include attribute information such as colour and/or whether or not an object has a particular function. The object may include position data, which is information representing the position of the object in the displayed image.

In some embodiments, the game engine will check if the selection of the game object satisfies the rule or rules required for this selection. The rule or rules will be dependent on the game.

A physics engine 408 may be provided which is configured to control the movement of the objects. The physics engine may be provided with information from the game engine as to how to control the object(s).

A view function 406 uses of the object data to provide the displayed image with which the user is able to view and/or interact Thus the user input is provided to the game engine. The input is used by the game engine to provide movement information to the physics engine. Based on the input, the physics engine will control the movement of one or more objects.

Object data, provided in a respective memory location, contains the data from which the game characteristics are defined. By way of example only, the data may identify the position or one or more attributes of the object. One or more attributes may be provided. By way of example only, the attributes may be size, colour, character or the like of the tile. For example, the data comprises X (x coordinate information); Y (y coordinate information); a (where a is one of a set of numbers and each number represents a different colour). The attribute data may not itself be stored with the game object data. In other embodiments, the attribute data may be stored with the game object data. It should be appreciated that the attributes mentioned are by way of example and any suitable attributes may be used in embodiments, dependent on the game.

The example above has numeric values to represent the colour attribute. For example the number 1 may mean red. It should be appreciated that this is by way of example only and any other suitable method may be used to indicate the value or type of a particular attribute. In some embodiments, the data may have n bits where n represents each of the possible values of each of the possible attributes and 1 and 0 are used to indicate if the particular value of an attribute is present.

In some embodiments, a word or collection of letters may be used to indicate a value of a particular attribute.

Some embodiments may only stream the game play moves from the mobile game to a game server. Based upon the game moves and initial game play information (such as board seed and player's inventory), the game server can generate a video that is identical to the displayed gameplay at the player's mobile phone. The video may be a video stream or a video recording.

That video may have a higher quality and higher resolution compared to a capture of the mobile phone screen.

Some embodiments provide the option of displaying additional information only for the viewers (such as the x next game objects to populate the game board where x is an integer).

Some embodiments provide the options on not displaying some information which is on the player's display such as chat feedback.

Figure 7:
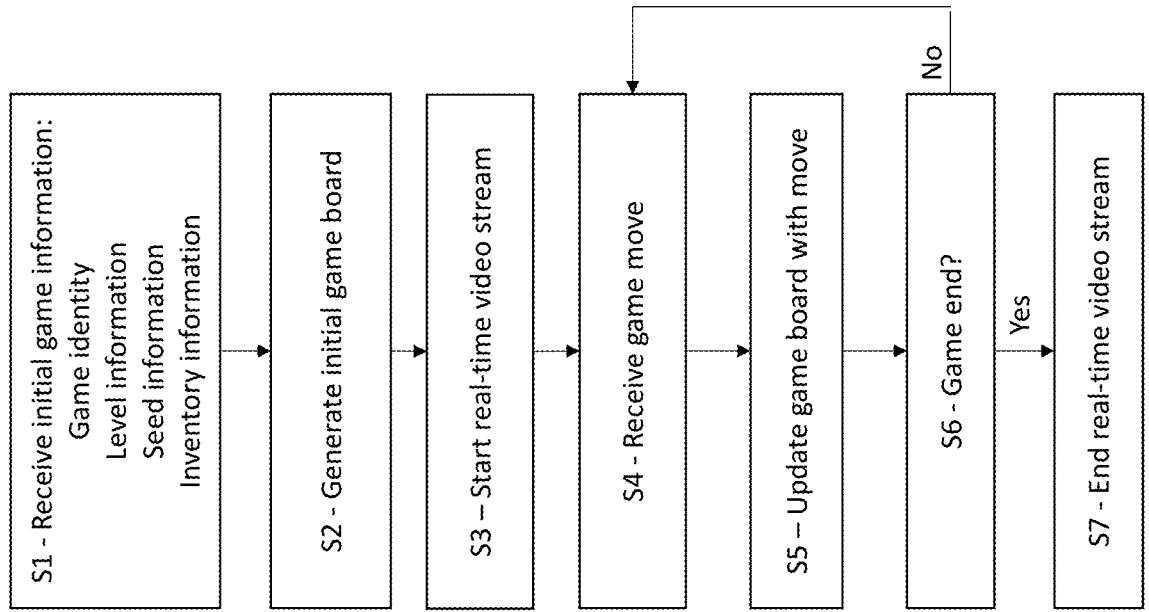
FIG. 7 is a flowchart for real time video generation according to an embodiment which may be carried out in the game server.

Some embodiment may have audio and/or video content provided from the mobile device and added to the video of game play References made to FIG. 7 which shows a method flow of an embodiment. The steps of FIG. 7 may be performed in the game server.

In step S1, the game server receives initial game information. The initial game information may take any suitable form and may be dependent on the game being played.

By way of example only, FIG. 6a shows one possible set of initial game information in an associated data structure.

Player identity information is provided in a first field 600. Game identity information is provided in a second field 602. Device identity information may be provided in a third field 604. Game level information may be provided in a fourth field. Level seed information 608 may be provided in the fifth field.

Optionally inventory information may be provided in the sixth field 612. Inventory information may comprise of items which have previously been purchased or acquired by a user through game play. By way of example only, inventory information may comprise one or more of boosters, in game assistance, in game currency and/or any other suitable items.

It should be appreciated that the order of the fields is by way of example only and in other embodiments, the fields may be provided in any other suitable order. It should be appreciated that in some embodiments, one or more of the fields shown may be omitted. Alternatively or additionally, one or more other suitable fields may be provided.

Reference is made to FIG. 7 again. In step S2, at the game server, an initial game board is generated. This initial game board is generated in response to the initial game information which has been received in step S1.

In step S3, a real-time video stream is started. It should be appreciated that the video stream will show the game board and any other of the associated images such as a timer, a score, an animation. Generally, whatever is displayed on the player's device as part of the game will also be in the generated real-time video stream.

In step S4, game move information is received. By way of example, reference is made to FIG. 6b which shows one example of the data structure which may be used to provide this information. This game data structure may comprise a first field 600 comprising the player identity information. A second field 602 may provide game identity information. In a third field 612, a game event is provided. That game event may provide move information or any other suitable game event information. The game event may for example be an end game event, the acquisition of a game item, such as discussed in relation to the inventory information, a specific move or the like. It should be appreciated that in some embodiments one or more additional fields may be provided. In some embodiments, alternatively or additionally, one or more of the field shown may be omitted.

In step S5, the game board is updated with the move and this shown in the video stream. Thus the game move is re-created in the video stream based on the game move information received from the user device. Again, the video stream generated will include all the images which is displayed on the display of the player's device.

In step S6, a determination is made as to whether or not a game has ended. This may be in response to game event information received from the use device or may be determined by the re-creation of the game in the server.

If not, the method returns to step S4. If it is determined that the game has ended in step S6, the video stream may be ended in step S7.

Figure 8:
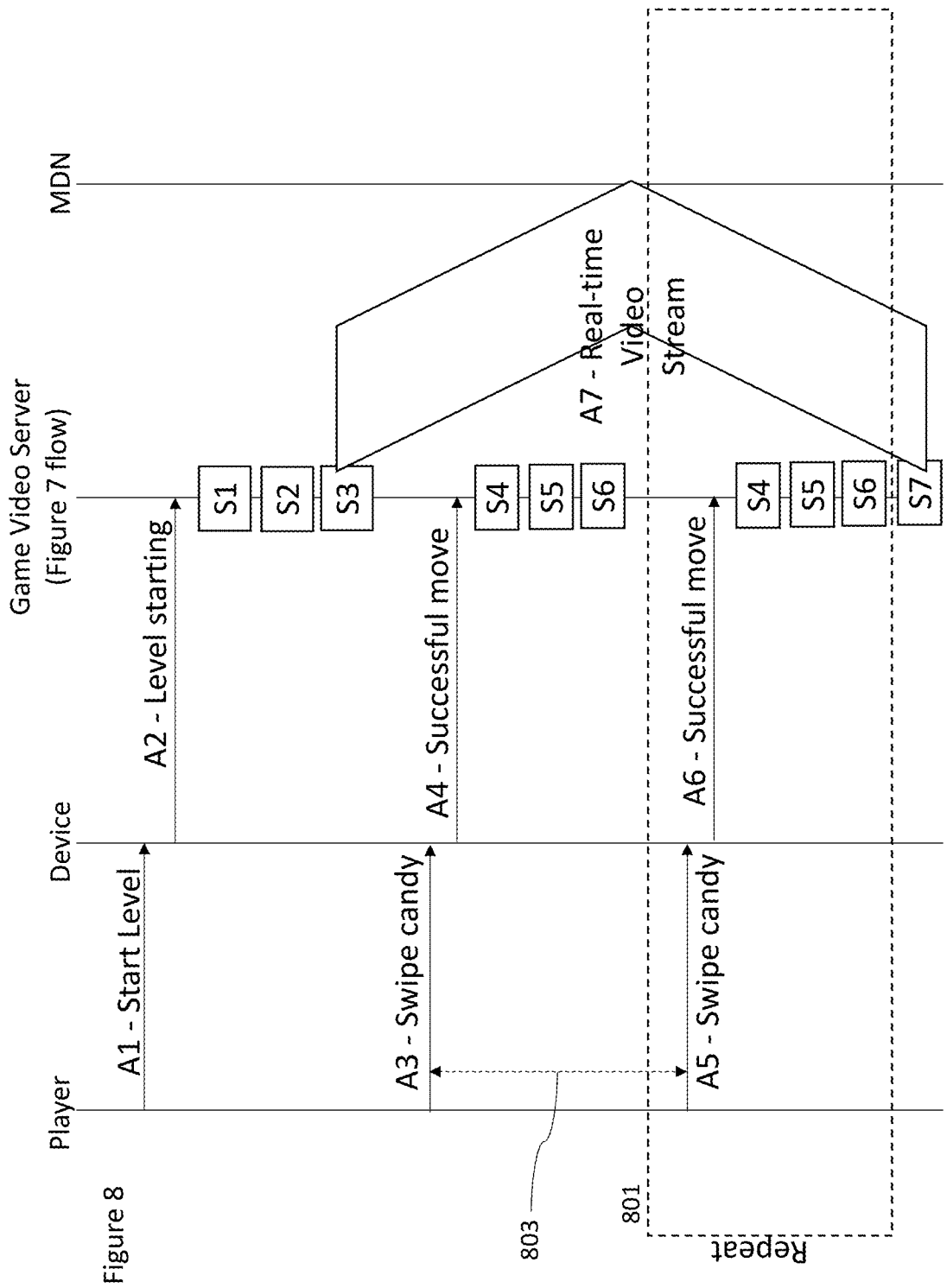
FIG. 8 shows the interactions of a player, the game device and the game video server for the method of FIG. 7.

Reference is made to FIG. 8 which schematically shows the activity of the player with respect to the device on which the game is being played, the activity of the device and the activity of game video server. This is in relation to the method of FIG. 7.

The player in step A1 interacts with the device to start a game level.

In step A2, the device is configured to cause information about the level starting to be sent directly or indirectly to the game video server.

The game video server is configure to perform the method shown in FIG. 7. As illustrated in FIG. 8, in response to receiving the information relating to the start of a level, steps S1, S2 and S3 as described in relation to FIG. 7 are performed. As schematically shown by arrow A7, a real time video stream is generated and provided to the MDN.

After step S3, the player interacts with the user device as referenced A3. In this example, the user is playing Candy Crush and accordingly the user input causes a candy to be swiped or any other suitable input.

The device determines whether or not this is a valid move and in response to that determination provides information on the valid move made to the game video server in step A4. Again, the communication may be direct or indirect.

On receipt of the move information, this triggers, in the game video server, the performance of steps S4, S5 and S6 as described in relation to FIG. 7.

In step A5, the user interacts with the device to make another move. In this game example, the player will swipe a candy.

In step A6, the device determines whether or not this is a successful move and in response to that determination provides information on the valid move made to the game video server.

On receipt of the move information, this triggers, in the game video server, the performance of steps S4, S5 and S6 as described in relation to FIG. 7.

It should be appreciated that the set of steps referenced A5, A6, S4, S5 and S6 will be repeated until the game is completed. This set of repeated steps are referenced 801.

In some embodiments, steps A5 and A6 may be omitted depending on the particular game being played.

In the example shown, steps A3 and A5 have the same type of move being made. In other embodiments, different user actions may be performed in steps A3 and A5.

Where the game requires repeated game moves, different game moves may be performed in different steps depending on the rules of the computer implemented game being played.

It should be appreciated that there will be a delay between user interactions which is referenced 803. It should be appreciated that this delay may be relatively short or in some embodiments may be relatively long. Some games such as casual games are such that a user may start a game but not complete it and only revert to the game, hours or even days later.

The real time video stream will continue until it is ended by the game video server in step S7.

Figure 9:
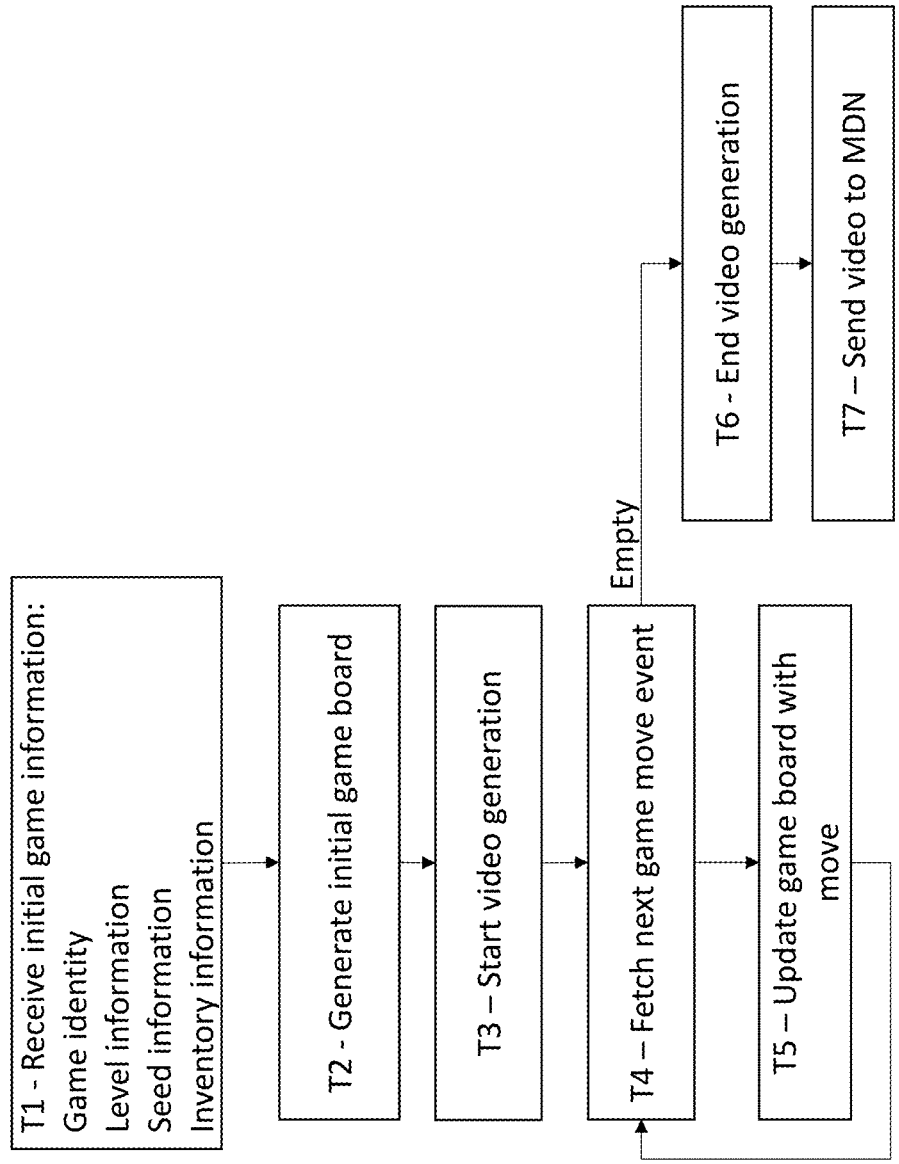
FIG. 9 shows a method flow for generating video from stored events.

Reference is now made to FIG. 9 which shows a further embodiment. In this embodiment, the game event data from the device is stored in any suitable location and the video is only generated in response in response to a request for that video.

Accordingly, in step T1, the initial game information such as mentioned in relation to S1 is received. However this will be from a data store and will not be received in real time.

Steps T2 and T3 are generally the same as steps to S2 and S3 previously described in relation to FIG. 7. However, in T3, the video is not being recreated in real time, that is as the user plays the game.

In step T4, the next game move event is fetched from store from the data store if available.

If the next move event is available, then the game board is updated with the fetched move in step T5. The method will then revert back to step T4.

If there are no further game events available in step T4, then the next step will be step T6 which will end the generation of the video.

In step T7, the video will be sent to the MDN. It should be appreciated that in this embodiment, the video generation may be completed before the video is sent to the MDN. In the alternative, the video may be streamed to the MDN as it is being generated, for example if it is being generated on demand.

Figure 10:
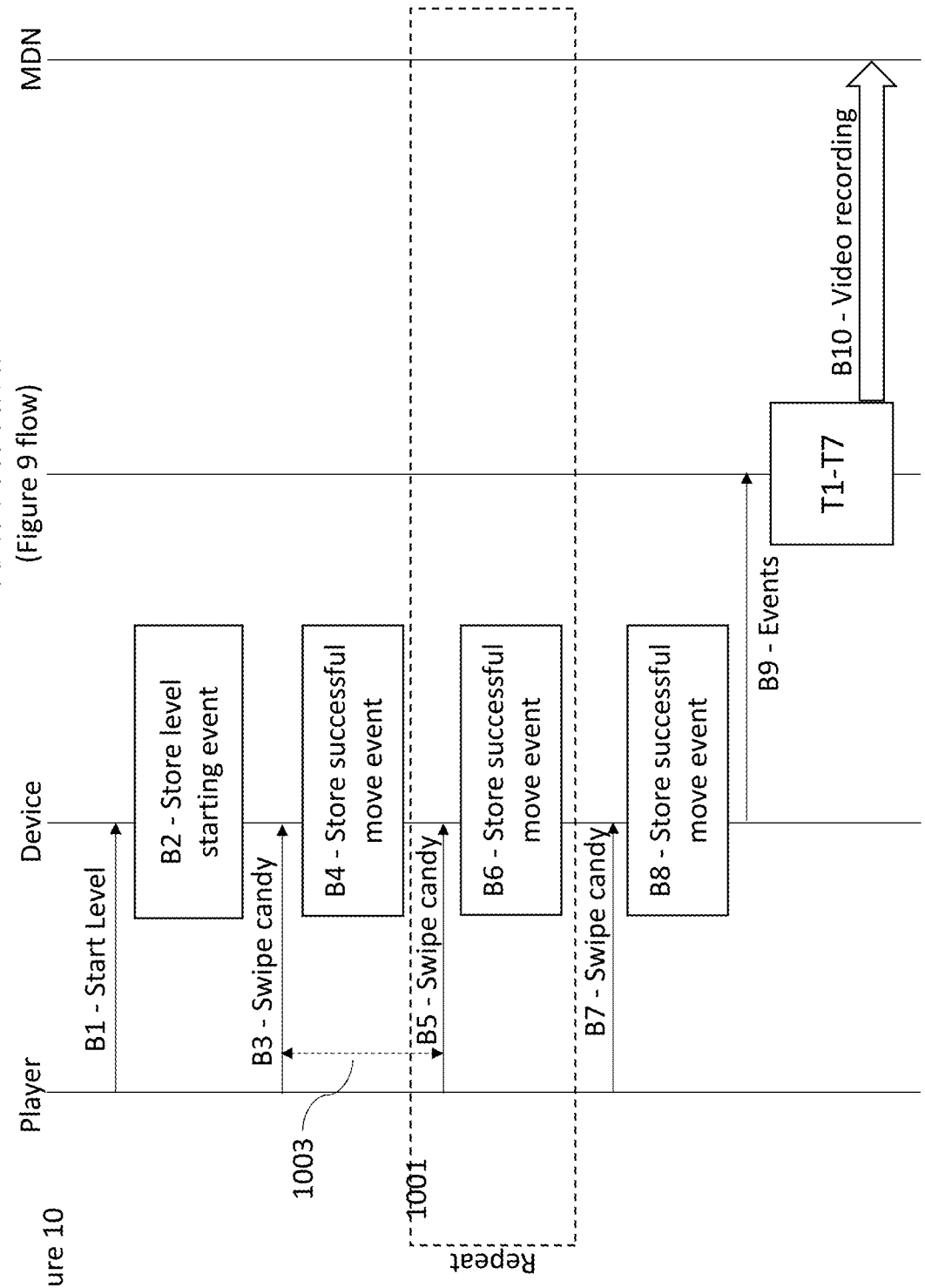
FIG. 10 shows the interactions of a player, the game device and the game video server for the method of FIG. 9.

Reference is made to FIG. 10 which schematically shows the activity of the player with respect to the device on which the game is being played, the activity of the device and the activity of game video server. This is in relation to the method of FIG. 9.

In step B1, the player interacts with the device to start the game level.

In step B2, the device will then store the level starting event in memory.

The player interacts with the user device as referenced B3. The user interacts with the device to swipe a candy.

In step B4, the valid move event is stored in memory.

In step B5, the user again user interacts with the device to swipe a candy.

In step B6, the valid move event is stored in memory in the device.

The delay between successive moves by the user is referenced 1003 in FIG. 10.

The steps B5 and B6 are repeated as required. This set of repeated steps is reference 1001.

The final move made is made by the user in step B7.

In step B8 the move event corresponding to the final move is stored in the device.

In step B9, all the events collected are sent together by the device to the video game server which then performs the method shown in FIG. 9. The events may be sent directly or indirectly to the video game server.

In step B10, the video game server generates a video recording which may be provided to the media distribution network. In other embodiments the video recording may be provided to any other suitable entity. In some embodiments, a video stream may alternatively be generated.

In other embodiments, the events may be sent as they occur to the game video server where they are stored and used for subsequent recreation of the video recording.

In another embodiment, the events may be provided to the video game server either together in a batch or in groups of one or one or more events.

In some embodiments, the events are sent to a data store such as a database from which they can be retrieved by the game video server. The events may be sent together in a batch, individually or in groups of two or more events.

In some embodiments, steps B5 and B6 may be omitted depending on the particular game being played.

Alternatively or additionally, in some embodiments, steps B7 and B7 may be omitted depending on the particular game being played.

In the example shown, steps B3 and B5 and B7 have the same type of move being made. In other embodiments, a different user actions may be performed in at least one of the steps.

Where the game requires repeated game moves, different game moves may be performed in different steps depending on the rules of the computer implemented game being played.

It should be appreciated that the example of a swipe candy move is only by way of example and different moves may be made in other embodiments.

Figure 11:
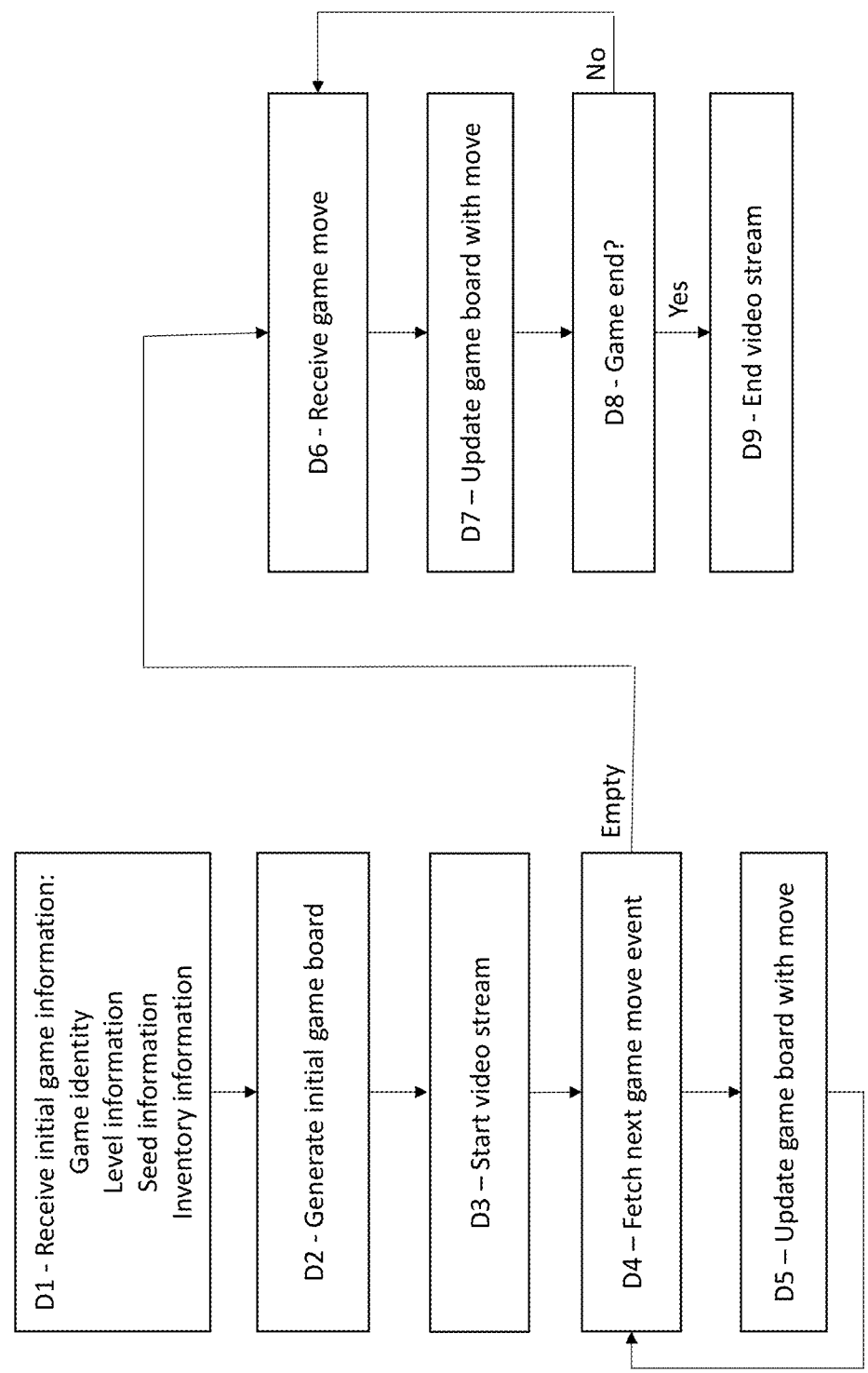
FIG. 11 shows a method for generating a video partly based on stored game events and partly based on real-time events.

Reference is made to FIG. 11 which shows a method where the initial part of the video stream is generated from stored data and the rest of the video is based on real-time events.

In this regard, steps D1 to D5 correspond to steps T1 to T5 of FIG. 9. In one modification, step D3 may be omitted and the video stream generation only starts when there is no game move event.

In step D4, if there is no game event to fetch then the next step is D6. This is then followed by steps D7, D8 and D9. Steps D6 to D9 correspond to steps S3 to S7 of FIG. 7. The real time events are used in these steps.

In some embodiments, the method may go from step D5 to D6 if it is known that there is no game move events available beyond the event which is being used to currently update the game board.

Thus, video stream based on stored events and real-time events can be provided. Alternatively, the video stream may only start when there is real time data available. However, the game board will be up-to-date based on the stored game events at the point that the real-time information is received.

Figure 12:
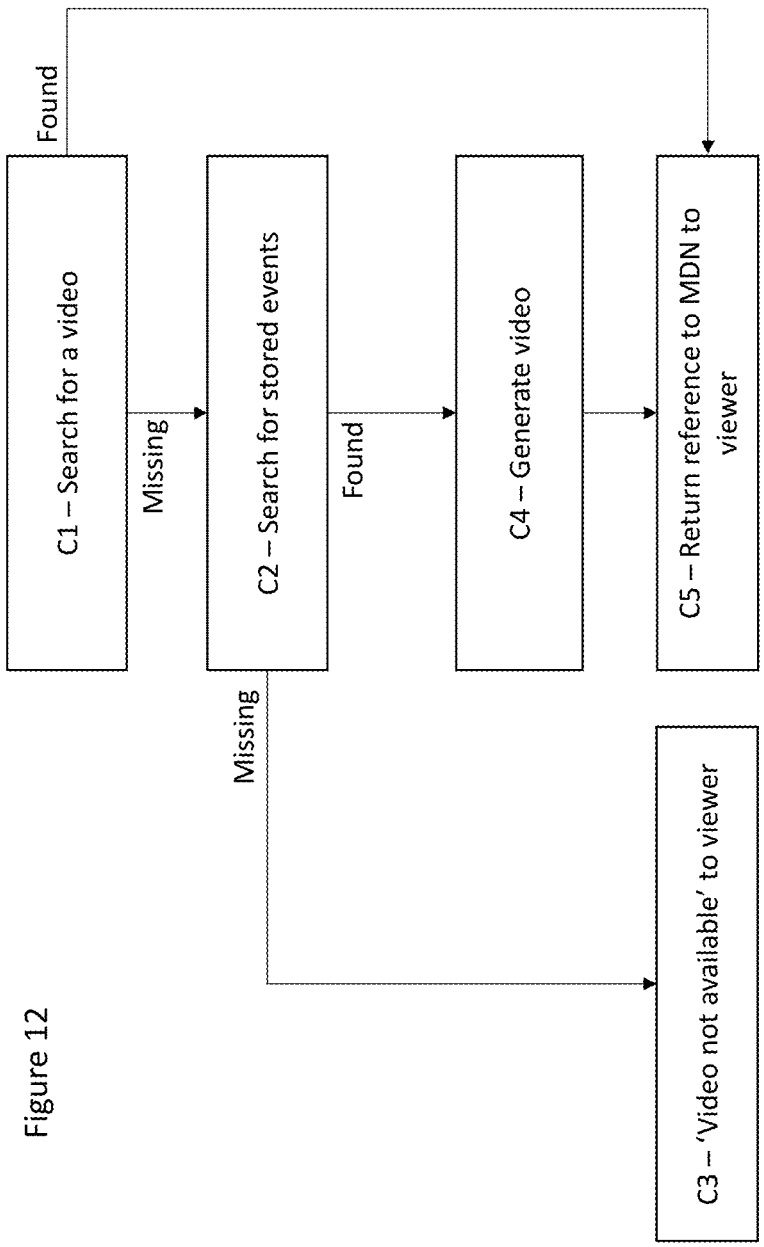
FIG. 12 shows a method for finding a video and if not available generating the video.

Reference is made to FIG. 12 which schematically shows a method for finding a particular video recording.

In step C1, a search is made for a video, for example, a video playback recording.

If the video is found, then the next step is step C5 in which information is provided to the viewing device which allows the viewing device to obtain the requested video.

In some embodiments, for example, a search may be made to see if a video playback recording exists. A user may provide an input query via the viewer device. The query may be used for example to search through a database of video playback recordings. If a requested video playback recording exists and has been found, then information may be provided to the viewing device in step C5 which allows the viewing device to obtain the requested video recording. This information may comprise a reference to that recording. The reference can take any suitable format and will be understood by the viewer. For example, the reference may be a hyperlink or any other suitable reference.

In other embodiments, for example, a search may be made to see if a video stream exists. A user may provide an input query via the viewer device. The query may be used for example to search for a video stream. If the video stream exists then information may be provided to the viewing device in step C5 which allows the viewing device to watch the video stream. This information may comprise a reference to that video stream. The reference can take any suitable format and will be understood by the viewer. For example, the reference may be a hyperlink or any other suitable reference.

Of course the video may be in any other suitable format.

If it is determined in step C1 that the requested video is missing, then the next step is C2 in which a search is made for the stored events associated with the requested video.

If the stored events are found, then in step C4 the requested video is generated or a video stream is generated. This may for example use the method of FIG. 9 or FIG. 11. The video can then be provided to the user in any suitable manner. In this example, the method will then, once the video has been generated proceed to step C5 as previously discussed. Alternatively, the video stream may be provided to the requesting user.

In some embodiments, a video playback recording may only be stored if that recording has been requested a threshold number of times.

If, on the other hand, no stored events are found in step C2, then in step C3, information is provided to the viewing device indicating that the video is unavailable.

In embodiments, the player's device may send events directly they occur to the game video server. The server may simply use the events to create read real time video and play back video directly. In some embodiments, the server may store the events additionally. This allows the on demand generation of a video stream as well.

In other embodiments, the client device may collect all of the events and send those events at a later time. Accordingly, this may mean that real time video cannot be created. However, the events can be used to create a video. If the events are additionally stored, the events can be used to create a video directly or on demand as required.

In some embodiment the events may be forwarded directly to the game video server or may be sent to the game server which then forwards the events to the game video server.

Reference is made to FIG. 13a which schematically shows a sequence of actions with respect to a game with the delay between different actions. For example, a game start animation is provided which is associated with a delay of 1200 ms. Action 2 is the player thinking which is 160 ms. This is followed by the player swiping a candy with a delay of 250 ms and so on.

As referenced 1412, there is a thinking time of 160 ms for sequence 2 and for sequence 5, the thinking time is 3580 ms this being referenced 1410. Other thinking time delays shown are 980 ms, 220 ms, As can be seen from FIG. 13a, the delay associated with swiping a candy has varying different time of 250 ms, 180 ms, 220 ms and 260 ms.

FIG. 13b shows the timing of the corresponding sequence actions in the generated video. As can be seen, the players thinking time is a constant value. In this example, it is shown as 200 ms. However this is by way of example only and any other suitable value can be shown. In the re-creation, the swiping candy action has a constant time value of 250 ms. Again, this is by way of example only and different values may be used.

If a user is playing a game on and off, an interesting video without undue delays may be recreated.

In other embodiments, the actual delay, i.e. the delay shown in FIG. 13a is provided in the output video.

In another embodiment, the timing shown in FIG. 13a is used in the generated video unless a particular delay exceeds a given amount of time in which case a default delay may be used. Different delays may be associated with different actions.

Figure 5:
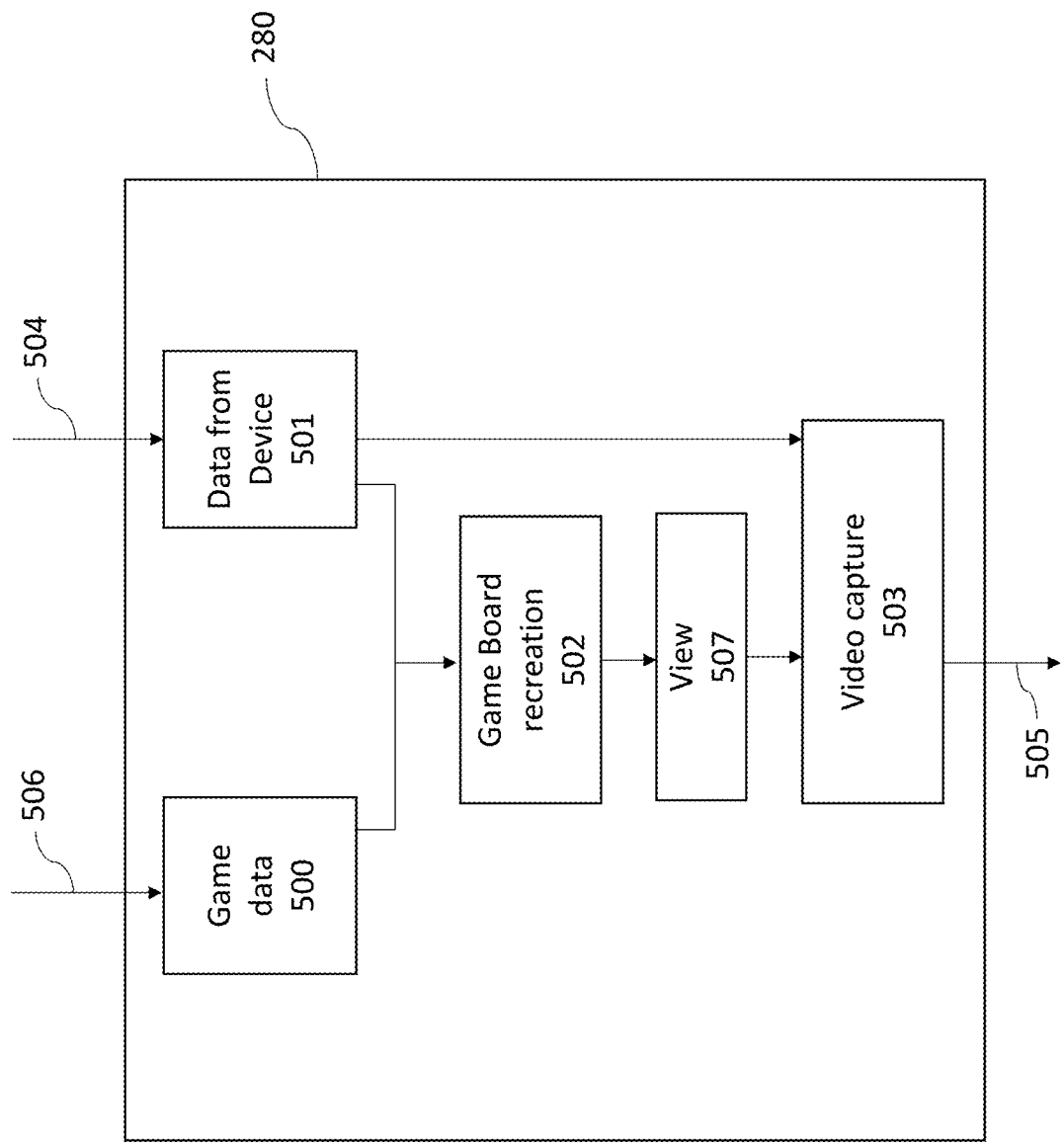
FIG. 5 shows an example of a game server of some embodiments.

Reference is made to FIG. 5 which is schematically shows the game video server 280 in more detail. The game server has an input, referenced 504 which is configured to receive the data from the user device. The data may comprise the data discussed in relation to FIG. 6a and/or 6b. The data may additionally comprise audio data captured while the user plays the game, video data captured of the user playing the game, text or the like.

The data from the user device is stored in a data store 501. The game server 220 also has a game data store 500 which stores game data. This is the data which is used to play the game. This data 506 may be received from a client and/or a game device. The game data may define the game board, the game objects, the game rules and/or the like. The game data and the data from the user device is provided to a game board re-creation block 502 which generates data which is provided to a view function 507 which allows video data to be created. The video data is provided to a video stream function 503 which creates a video stream. The output video stream is referenced 505.

It should be appreciated that the game re-creation function may replicate the functions of the game engine 402, the object data store 404, and the physics engine 408, shown in FIG. 4 to replicate the functionality provided in the user device. The view function 406 may be provided by view function 507. The game data store will provide the game data for providing the initial game board, this being dependent on the initial information provided for example by the data structure shown in FIG. 6a. For example, the initial information may identify the level of the game and hence the game board to be recreated along with the particular seed being used. In some embodiments, a level of a game may be associated with a plurality of different seeds. This means that a user will have a different initial game board when replaying levels.

It should be appreciated that alternatively or additionally, the game data store may be part of the game re-creation functionality.

The data from the user device may represent the user input. In some embodiments, the user input may be processed before being provided to the game server from the user device. For example, the data may for example indicate which object is being moved, from which start position and to which end position. In other embodiments, the user input data may be provided as raw data comprising start position of a selected object with respect to the display and an end position with respect to the display. The game re-creation function 502 is able to re-create the move made by the user at the user device. In one embodiment, it is preferred that the user input indicates which object or objects have been selected and what action has been taken with respect to those objects.

In this way, the game re-creation unit is able to replicate the game play on the user device to provide in conjunction with the view function a video stream of game play but without requiring a video stream of game play to be streamed from the user device. This makes a more effective use of video resources.

In some embodiments, the data which is received from a user device for a particular game may be stored and if the associated video is requested, the video may be re-created from the stored data. This may provide a more efficient storage of data as compared to storing each video generated. However, in other embodiments, the video data may be stored.

The view data function may be used by the game re-creation functionality to create the video data which is provided to the video stream function.

In some embodiments, the game server is able to re-create a video stream but with one or more different parameters as compared to the game being played on the user device. For example, one or more of the following parameters of the re-created video may differ from the game being played on the user device:

Resolution; aspect ratio; orientation; frame rate; layout; quality; animation quality; and/or the like.

For example, the re-created data stream can have a much higher quality than the corresponding image on the limited screen resource on the user device. In some embodiments, the game may be played in one aspect ratio and/or orientation (e.g. portrait or landscape) and recreated with a different aspect ratio and/or orientation.

In some embodiments, the video stream data may be provided in a plurality of different formats. For example, a high definition data stream can be provided and another, lower definition format may be suitable for playing on a mobile device. The orientation and/or ratio aspects may change. Alternatively or additionally, the resolution may change.

In some embodiments, the data from the user device may include data which is to be superimposed on the video stream and/or provided in conjunction therewith. For example, this may be audio content, video data associated with the player as opposed to the game, and/or any other suitable content. This additional content may be provided directly to the video stream generation part 503.

Figure 14:
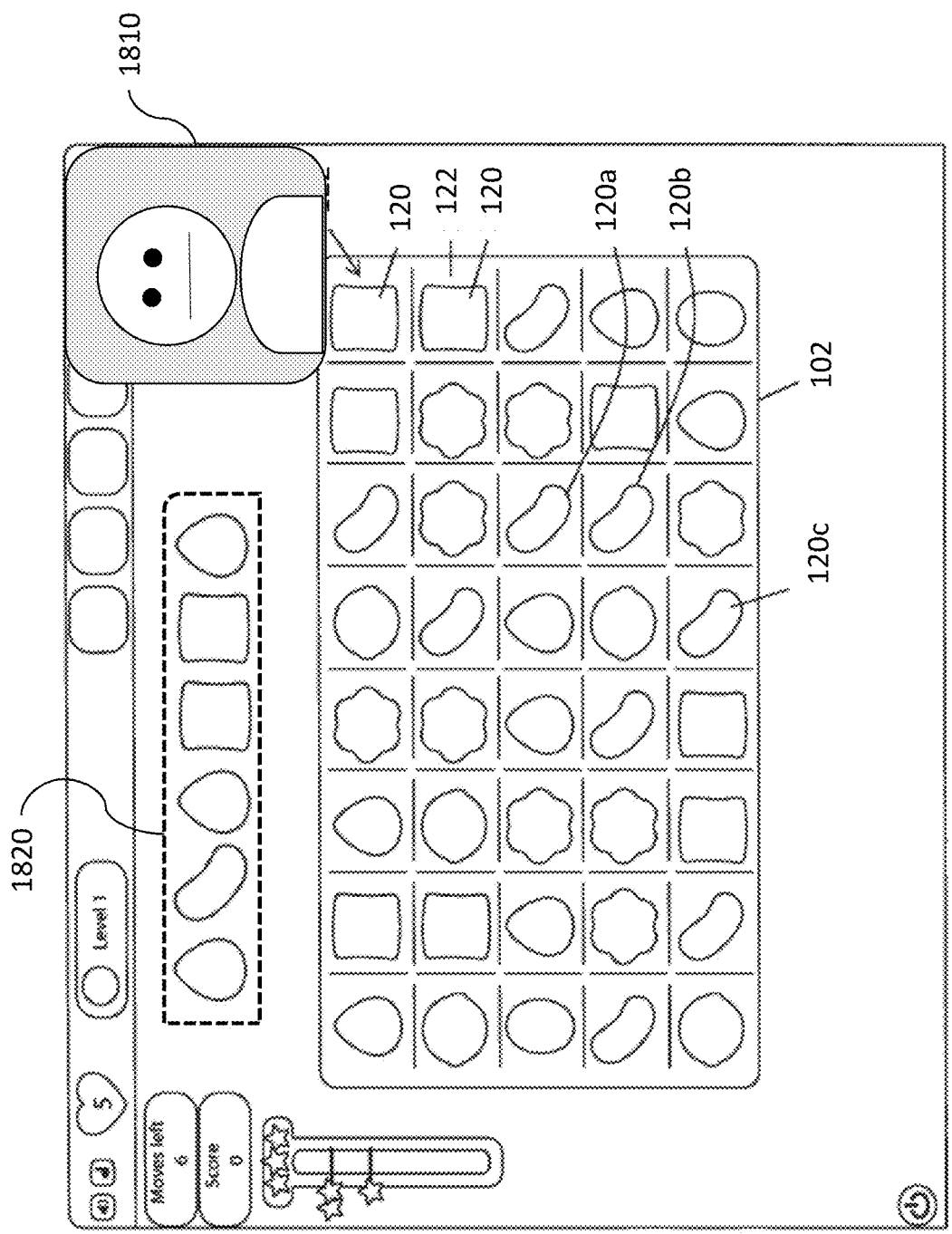
FIG. 14 schematically shows a video image generated in some embodiments.

Reference is made to FIG. 14 which shows an example of a video which is recreated. This is for the game shown in FIG. 3a. As can be seen, the video in addition to the game play also includes an image of the user referenced 1810. This may be a static image avatar or may be a video footage of the user.

In some embodiments, the video footage may have a relatively low resolution as the image may be relatively small. In some embodiments, the video footage is provided from the player's device at a relatively low resolution. In other embodiments, higher resolution video footage may be provided by the player's device and may be processed by the game server to have a lower resolution.

In some embodiments, the video may show information which is not seen to the user during game play. For example, in the area referenced 1820, the next six candies to be provided on the game board are shown in order.

In some embodiments, the video stream may be provided generally in real time, which is with only a small delay in time between the move been made and the corresponding video stream being available. Accordingly, if the user takes a relatively large amount of time to make a move that will be reflected in the video stream. In this embodiment, the moves may be associated with a time stamp in order to allow the real-time re-creation of the game. Alternatively, the date of receipt of the data from the user device is used to control the timing of the video stream. Any audio, video or text data to be added to the video stream may be time stamped so as to be coordinated with the corresponding game play.

However, it should be appreciated that in other embodiments, the video stream can be re-created without any delay taken by a user to make moves. This may be advantageous in games where the user stops and starts playing a particular game, as is not unusual with casual games. In some embodiments, the timing can therefore be controlled by the game server in dependence on the game data which is received from the user device.

In some embodiments, it is possible to remove or omit information which would be otherwise present on the user device. For example, when a user device is playing a game, often advertisements of one form or another may be displayed on the display. In some embodiments, these advertisements may not be present in the generated video stream. In other embodiments, it may be desirable to include those advertisements or indeed to include other advertisements in the generated video data stream.

Where a user is chatting online with another user, that chat may be omitted.

Embodiments may allow a significant saving of memory. Take for example a game which has 450 levels and 100 million players. If the average level reached as 120, the average number of the attempts taken to complete a level is 2.3, and the average event size storage is 20 kB, the total event storage size would be 514 TB. Although this seems a large number of bytes, data farms and data storage facilities are able to accommodate this magnitude of data quite easily. However, if instead of storing the events the videos are stored, this would, in assuming each video storage size to be 200 MB require 5.14 exabytes (EB). This size of memory is excessively large. A further complication is that various different video formats are required depending on the play back format supported by the viewing device. Typically, there are 6 video format variations and to have all 6 video variations of each video would require just over 30 EB. In contrast, the number of video variations would of course have no impact on the total events storage size of some embodiments.

Generally, the number of videos which are watched a significant number of times is relatively low and there may be a relatively large number of videos which may not even be watched once. Some embodiments may be useful in this context if a number of the videos are only generated in response to a user request.

In some embodiments, video generation may be triggered by one or more factors. For example, play at particular levels may be recorded. For example some games may categorise levels, with some of the levels being categorised as hard. This may trigger the video generation with respect to that level. Other levels may have a particular significance, e.g. an end of a set of levels or have a particular game objective or game objective which triggers the recording of that level.

In some embodiments, video generation may be triggered for the game play which is considered to be particularly good, for example game play which resulted in the highest number of points being achieved for a level or the level being completed in the fewest number of moves.

In some embodiments, a video playback recording is only stored when that video has been requested a threshold number of times.

As mentioned previously, the progress of other players may be shown when a user plays a game. The other players may be social media friends and/or other players of the game. In some embodiments, interaction of the user via the user interface may allow one or more videos associated with a respective other player to be downloaded to the player's device. This may be using, for example, the method shown in FIG. 12.

In some embodiments, the event data associated with a game may be stored on a player's device. The player's device may be configured to generate a video stream based on the stored event data for display on the player's device. In this way a player may watch a previously played level. In other embodiments, the method shown in FIG. 12 may be used.

Some embodiments have been described in the context of games which have a plurality of different levels. It should be appreciated that this is by way of example only and other embodiments may be used with games which do not have such levels.

Embodiments have described the generation of a video. It should appreciated that this may also comprise the generation of associated audio content.

Some embodiments have been described in the context of specific types of product/software. It should be appreciated that this is by way of example only and other embodiments may be implemented using any other product/software.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

An appropriately adapted computer program code product or products may be used for implementing the embodiments, when loaded on an appropriate data processing apparatus, and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof.

Some embodiments may be provided as a computer program product, included on a computer or machine-readable medium having stored thereon the executable instructions of a computer-readable program that when executed on at least one processor cause a method according to some embodiments to be carried. The terms "computer-readable medium" or "machine-readable medium" as used herein includes any medium that participates in providing instructions to a processor or other components of computer system for execution. Such a medium may take many forms including, but not limited to, storage type media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium. Some embodiments may be downloaded or distributed as a computer program product, wherein the computer-readable program instructions may be transmitted from a remote computer such as a server to a user device by way of data signals embodied in a carrier wave or other propagation medium via a network.

The person skilled in the art will realise that the different approaches to implementing the methods and control module are not exhaustive, and what is described herein are certain embodiments. It is possible to implement the above in a number of variations without departing from the spirit or scope of the invention.

The invention claimed is:

1. A game server comprising:
   an input configured to receive user game data associated with a computer implemented game, the computer implemented game being played on a first user device by a first user, the user game data comprising information identifying a level of the computer implemented game, information indicating an initial configuration of the level of the computer implemented game being played on the first user device, and information about one or more discrete moves made responsive to user input during playing of the level of the computer implemented game on the first user device by the first user;

a first data store configured to store the user game data;

a second data store configured to store generic game data for each level of the computer implemented game;

at least one processor configured to retrieve the stored user game data and stored generic game data for the level to:

generate initial level data corresponding to the initial configuration of the level being played at the first user device using the user game data and the generic game data;

generate video data using the initial level data, the information about the one or more discrete moves, and the generic game data for the level, the video data re-creating playing of the level of the computer implemented game played on the first user device; and an output configured to output the video data to a second user device, whereby a second user is able to watch a video on the second user device showing the computer implemented game as played by the first user on the first user device.

2. The game server as claimed in claim 1, wherein the input is configured to receive the user game data substantially in real time and the at least one processor is further configured to generate the video data substantially in real time.

3. The game server as claimed in claim 1, wherein the at least one processor is configured to retrieve from the first data store, the user game data for one part of the computer implemented game and to receive user game data for another part of the computer implemented game substantially in real time, the at least one processor being configured to generate the video data from the user game data for the one part of the game and the user game data for the another part of the game.

4. The game server as claimed in claim 1, wherein the at least one processor is configured to generate the video data in a plurality of different formats.

5. The game server as claimed in claim 1, wherein the video data is associated with a format different to a format used by the first user device to display the computer implemented game.

6. The game server as claimed in claim 1 wherein the video data has one or more different parameters to a corresponding parameter used by the first user device.

7. The game server as claimed in claim 6, wherein the one or more parameters comprise one or more of: resolution; quality; frame rate;
layout; orientation.

8. The game server as claimed in claim 1, wherein the input is further configured to receive further data to be combined with the output video data.

9. The game server as claimed in claim 8, wherein the further data comprises one or more of audio data, video data and text data.

10. The game server as claimed in claim 1, wherein the user game data comprises time stamp information, and the at least one processor is configured to re-create the computer implemented game with a timing dependent on the time stamp information.

11. The game server as claimed in claim 1, wherein the one or more discrete moves are associated with a first timing and the at least one processor is configured to retain the first timing in the video data.

12. The game server as claimed in claim 1, wherein the at least one or more discrete moves are associated with a first timing and the at least one processor is configured to change the first timing to a second timing in the video data.

13. The game server as claimed in claim 1, wherein the input is configured to receive a request for the video, the at least one processor is configured to determine if the requested video is available and if so to cause the requested video to be provided to a requester of the video.

14. The game server as claimed in claim 1, wherein the input is configured to receive a request for the video, the at least one processor is configured to determine if the requested video is available and if not to cause the requested video to be generated and provided to a requester of the video.

15. The game server as claimed in claim 1, wherein the information indicating the initial configuration of the level comprises information indicating an initial game board for the level.

16. The game server as claimed in claim 1, wherein the input is configured to receive, from the second user device, a request to view the video, and wherein the server is configured to output the video data to the second user device responsive to the received request.

17. A computer implemented method performed by a computer game server, the server having at least one processor, an input and an output, the method comprising:

receiving at the input, user game data associated with a computer implemented game, the computer implemented game being played on a first user device by a first user, the user game data comprising information identifying a level of the computer implemented game, information indicating an initial configuration of the level of the computer implemented game being played on the first user device, and information about one or more discrete moves made responsive to user input during playing of the level of the computer implemented game on the first user device by the first user;

storing, in a first data store, the user game data;

storing, in a second data store, generic game data for each level of the computer implemented game;

retrieving, by the at least one processor, the stored user game data and the stored generic game data;

generating, by the at least one processor, initial level data corresponding to the initial configuration of the level being played at the first user device using the user game data and the generic game data;

generating video data using the initial level data, the information about the one or more discrete moves, and the generic game data for the level, the video data re-creating playing of the level of the computer implemented game played on the first user device; and outputting via the output the video data to a second user device, whereby a second user is able to watch a video on the second user device showing the computer implemented game as played by the first user on the first user device.

18. A non-transitory computer readable storage device storing instructions that, when executed by at least one processor of a computer implemented game server causes the at least one processor to perform the following steps:

receive input user game data associated with a computer implemented game, the computer implemented game being played on a first user device by a first user, the user game data comprising information identifying a level of the computer implemented game, information indicating an initial configuration of the level of the computer implemented game being played on the first user device, and information about one or more discrete moves made responsive to user input during playing of the level of the computer implemented game on the first user device by the first user;

store, in a first data store, the user game data;

store, in a second data store, generic game data for each level of the computer implemented game;

retrieve the stored user game data and the stored generic game data for the level;

generate initial level data corresponding to the initial configuration of the level being played at the first user device using the user game data and the generic game data;

generate video data using the initial level data, the information about the one or more discrete moves, and the generic game data for the level, the video data recreating playing of the level of the computer implemented game on the first user device; and output the video data to a second user device, whereby a second user is able to watch a video on the second user device showing the computer implemented game as played by the first user on the first user device.

* * * * *